United States Patent
Merlin et al.

(10) Patent No.: US 10,218,483 B2
(45) Date of Patent: Feb. 26, 2019

(54) SYSTEMS AND METHODS FOR SIGNALING AND GENERATING VARIABLE LENGTH BLOCK ACKNOWLEDGMENT FIELDS IN A WIRELESS NETWORK

(71) Applicant: QUALCOMM Incorporated, San Diego, CA (US)

(72) Inventors: Simone Merlin, San Diego, CA (US); Alfred Asterjadhi, San Diego, CA (US); Bin Tian, San Diego, CA (US); George Cherian, San Diego, CA (US); James Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/264,240

(22) Filed: Sep. 13, 2016

(65) Prior Publication Data
US 2017/0093547 A1    Mar. 30, 2017

Related U.S. Application Data

(60) Provisional application No. 62/232,972, filed on Sep. 25, 2015.

(51) Int. Cl.
| H04L 5/00 | (2006.01) |
| H04L 29/06 | (2006.01) |
| H04L 29/12 | (2006.01) |
| H04L 1/16 | (2006.01) |
| H04L 1/18 | (2006.01) |
| H04W 92/10 | (2009.01) |

(52) U.S. Cl.
CPC .......... *H04L 5/0055* (2013.01); *H04L 1/1671* (2013.01); *H04L 1/1864* (2013.01);
(Continued)

(58) Field of Classification Search
CPC ... H04L 1/1614; H04L 1/1621; H04L 1/1671; H04L 1/1864; H04L 5/00; H04L 5/0055;
(Continued)

(56) References Cited

U.S. PATENT DOCUMENTS

| 9,019,822 B2* | 4/2015 | Asterjadhi | ............ H04L 1/0025 |
| | | | 370/230 |
| 9,253,290 B2* | 2/2016 | Asterjadhi | .............. H04L 69/04 |

(Continued)

FOREIGN PATENT DOCUMENTS

| WO | WO 2006015252 A1 * | 2/2006 | .......... H04L 1/1829 |
| WO | WO-2006016745 A1 | 2/2006 | |
| WO | WO-2014014577 A1 | 1/2014 | |

OTHER PUBLICATIONS

International Search Report and Written Opinion—PCT/US2016/051723—ISA/EPO—dated Nov. 30, 2016.

*Primary Examiner* — Tri H Phan
(74) *Attorney, Agent, or Firm* — Knobbe, Martens, Olson & Bear LLP

(57) ABSTRACT

Systems, methods, and apparatuses for signaling and generating variable length block acknowledgement fields in a wireless network are provided. One aspect of this disclosure provides a method of wireless communication. The method includes generating, by an apparatus, a block acknowledgment (BA) frame comprising a BA bitmap field. The method further includes determining a size of the BA bitmap field. The method further includes inserting an indication of the determined size of the BA bitmap field.

44 Claims, 6 Drawing Sheets

(52) U.S. Cl.
CPC .......... *H04L 61/6022* (2013.01); *H04L 69/22* (2013.01); *H04L 1/1614* (2013.01); *H04L 1/1621* (2013.01); *H04W 92/10* (2013.01)

(58) Field of Classification Search
CPC ..... H04L 29/06; H04L 29/12; H04L 61/6022; H04L 69/22; H04W 92/10
See application file for complete search history.

(56) References Cited

U.S. PATENT DOCUMENTS

| | | | | |
|---|---|---|---|---|
| 2006/0034274 | A1* | 2/2006 | Kakani | H04L 1/1829 370/389 |
| 2006/0034317 | A1* | 2/2006 | Hong | H04L 1/1614 370/445 |
| 2013/0223211 | A1* | 8/2013 | Asterjadhi | H04L 1/0025 370/230 |
| 2013/0301569 | A1 | 11/2013 | Wang et al. | |
| 2015/0092697 | A1* | 4/2015 | Yeow | H04L 1/0025 370/329 |
| 2016/0142185 | A1* | 5/2016 | Merlin | H04L 1/1607 370/312 |
| 2016/0248569 | A1* | 8/2016 | Ghosh | H04L 1/1614 |
| 2017/0201343 | A1* | 7/2017 | Merlin | H04L 1/0007 |
| 2017/0238286 | A1* | 8/2017 | Chun | H04W 72/042 370/329 |
| 2017/0373799 | A1* | 12/2017 | Noh | H04L 1/1628 |
| 2018/0069663 | A1* | 3/2018 | Du | H04L 1/1614 |
| 2018/0124858 | A1* | 5/2018 | Gan | H04W 72/04 |
| 2018/0191480 | A1* | 7/2018 | Asterjadhi | H04L 5/0055 |
| 2018/0220357 | A1* | 8/2018 | Kim | H04L 1/00 |

\* cited by examiner

Table 8-24—BlockAck frame variant encoding

| Multi-TID subfield value | Compressed Bitmap subfield value | GCR subfield value | BlockAck frame variant |
|---|---|---|---|
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Reserved |
| 1 | 1 | 1 | Reserved |

SYSTEMS AND METHODS FOR SIGNALING AND GENERATING VARIABLE LENGTH BLOCK ACKNOWLEDGMENT FIELDS IN A WIRELESS NETWORK

CROSS-REFERENCE TO RELATED APPLICATION INFORMATION

The present Application for Patent claims priority to Provisional Application No. 62/232,972 entitled "SYSTEMS AND METHODS FOR SIGNALING AND GENERATING VARIABLE LENGTH BLOCK ACKNOWLEDGMENT FIELDS IN A WIRELESS NETWORK" filed Sep. 25, 2015, which is expressly incorporated by reference herein.

BACKGROUND

Field

The present application relates generally to wireless communications, and more specifically to systems, methods, and devices for signaling and generating variable length block acknowledgement (BA) frames in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN).

As wireless communications continue to advance, communication schemes continue to grow more complicated, there may be a need to more efficiently transmit messages and frames across various communication schemes.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of the present application provides a method for wireless communication. The method comprises generating, by an apparatus, a block acknowledgment (BA) frame comprising a BA bitmap field. The method further comprises determining a size of the BA bitmap field. The method further comprises inserting an indication of the determined size of the BA bitmap field.

Another aspect of the present application provides an apparatus for wireless communication. The apparatus comprises a processor configured to generate a block acknowledgment (BA) frame comprising a BA bitmap field. The processor further configured to determine a size of the BA bitmap field. The processor further configured to insert an indication of the determined size of the BA bitmap field.

Yet another aspect of the present application provides a non-transitory computer-readable medium comprising code that, when executed, causes the apparatus to perform a method, the method comprising generating, by an apparatus, a block acknowledgment (BA) frame comprising a BA bitmap field. The method further comprises determining a size of the BA bitmap field. The method further comprises inserting an indication of the determined size of the BA bitmap field.

Yet another aspect of the present application provides an apparatus for wireless communication. The apparatus comprises means for generating, by an apparatus, a block acknowledgment (BA) frame comprising a BA bitmap field. The apparatus further comprises means for determining a size of the BA bitmap field. The apparatus further includes means for inserting an indication of the determined size of the BA bitmap field.

DETAILED DESCRIPTION

Figure 1:
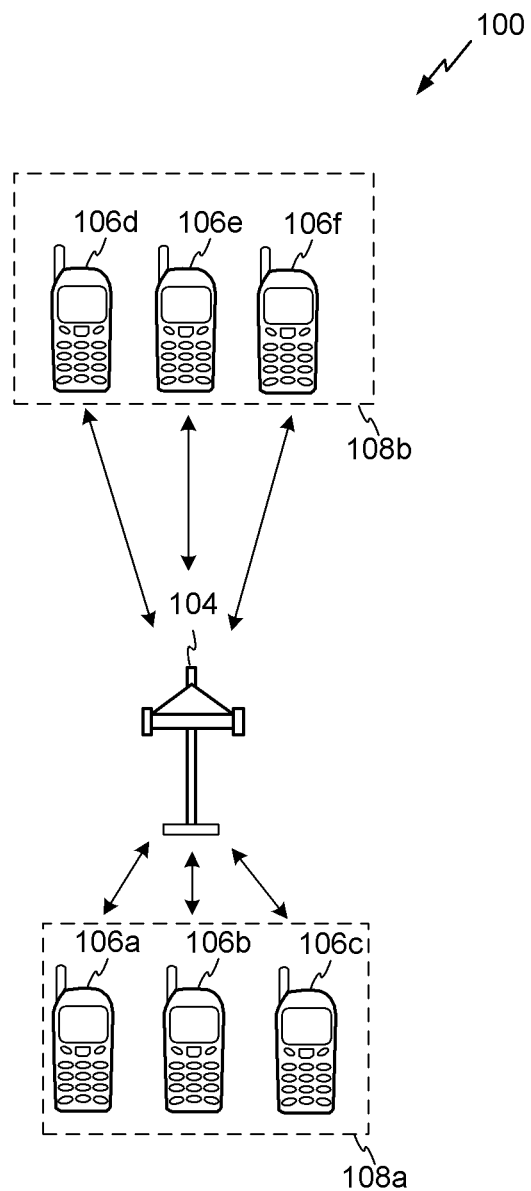
FIG. 1 illustrates an example of a wireless communication system in which aspects of the present disclosure may be employed.

Various aspects of the novel apparatuses and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ax, 801.11ac, 802.11n, 802.11g, and/or 802.11b protocols.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of 802.11 protocols may be used for sensors, metering, and smart grid networks. Advantageously, aspects of certain devices implementing 802.11 protocols may consume less power or provide higher communication speeds than devices implementing other wireless protocols, such as 802.11b, 802.11g, 802.11n or 802.11ac for example.

Certain of the devices described herein may further implement Multiple Input Multiple Output (MIMO) technology. This may also be implemented as part of 802.11 protocols. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ax) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement 802.11 protocols. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications. Block acknowledgement frames may be used to acknowledge multiple messages received (e.g., a media access control (MAC) protocol data unit (MPDU)) together. In some embodiments, it may be desirable to vary a length of the block acknowledgement frame to adapt to network conditions. Techniques are needed to indicate the presence of the variable length block acknowledgements and determine the length of the block acknowledgment.

FIG. 1 illustrates an example of a wireless communication system 100 in which aspects of the present disclosure may be employed. The wireless communication system 100 may operate pursuant to a wireless standard, for example at least one of the the 802.11ac, 802.11n, 802.11g and 802.11b standards. The wireless communication system 100 may include an AP 104, which communicates with STAs 106a-106f.

A variety of processes and methods may be used for transmissions in the wireless communication system 100 between the AP 104 and the STAs 106a-106f. For example, signals may be transmitted and received between the AP 104 and the STAs 106a-106f in accordance with OFDM/OFDMA techniques. If this is the case, the wireless communication system 100 may be referred to as an OFDM/OFDMA system. Alternatively, signals may be transmitted and received between the AP 104 and the STAs 106a-106f in accordance with CDMA techniques. If this is the case, the wireless communication system 100 may be referred to as a CDMA system.

In FIG. 1, the STAs 106a-106c may comprise high efficiency (HEW) wireless stations (e.g., stations that operate according to 802.11ax or later developed communication protocols), while the STAs 106d-106f may comprise "legacy" wireless stations (e.g., stations that operate according to one or more of 802.11a/b/g/n/ac communication protocols). For example, any of the STAs 106a-106c may be configured to communicate at higher data rates and/or to utilize less energy during communication or operation as compared to the legacy wireless STAs 106d-106f. Thus, for the purposes of this disclosure, the STAs 106a-106c may be considered part of a first group of STAs 108a, while the STAs 106d-106f may be considered part of a second group of STAs 108b.

It should be noted that the wireless communication system 100 may not have a central AP 104, but rather may function as a peer-to-peer network between the STAs 106a-106f. Accordingly, the functions of the AP 104 described herein may alternatively be performed by one or more of the STAs 106a-106f.

Figure 2:
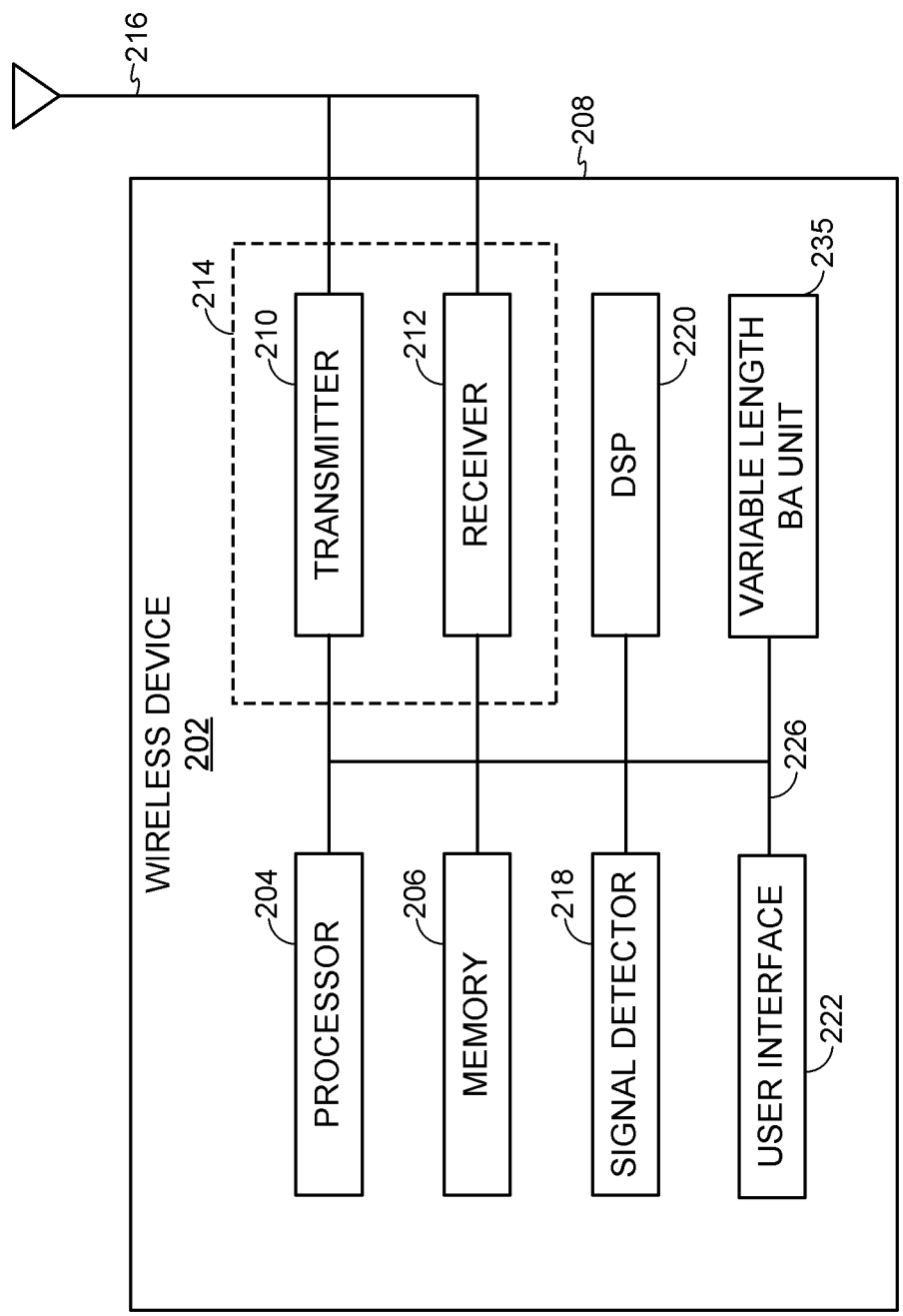
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106a-106f.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory machine-readable media for storing code or software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during MIMO communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a PLCP protocol data unit (PPDU). In some aspects, the PPDU may be referred to as a frame or packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

In some aspects, the wireless device 202 may further comprise a variable length block acknowledgement (BA) unit 235. The variable length BA unit 235 may be configured to adjust the length of a BA frame based on certain parameters. The variable length BA unit 235 may also be configured to indicate that the BA frame comprises a bitmap size different than 64 bits. In some aspects, transmitting and/or signaling a variable length BA frame can allow for efficient use of the wireless medium and reduce overhead.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106a-106f, and may be used to transmit and/or receive communications. The communications exchanged between devices in a wireless network may include data units which may comprise packets or frames. In some aspects, the data units may include data frames, control frames, and/or management frames. Data frames may be used for transmitting data from an AP and/or a STA to other APs and/or STAs. Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

A variable length BA frame may allow a device to have more flexibility when receiving and/or transmitting BA frames based on network conditions. Typically, a BA frame comprises a BA bitmap that has a fixed length of 64 bits. In certain embodiments, it may be beneficial to have a variable length BA bitmap to better adjust to network conditions (e.g., increase the bitmap size to increase throughput or decrease bitmap size to reduce overhead. Accordingly, embodiments described herein relate to transmitting and signaling the presence of a variable length BA frame.

Figure 3:
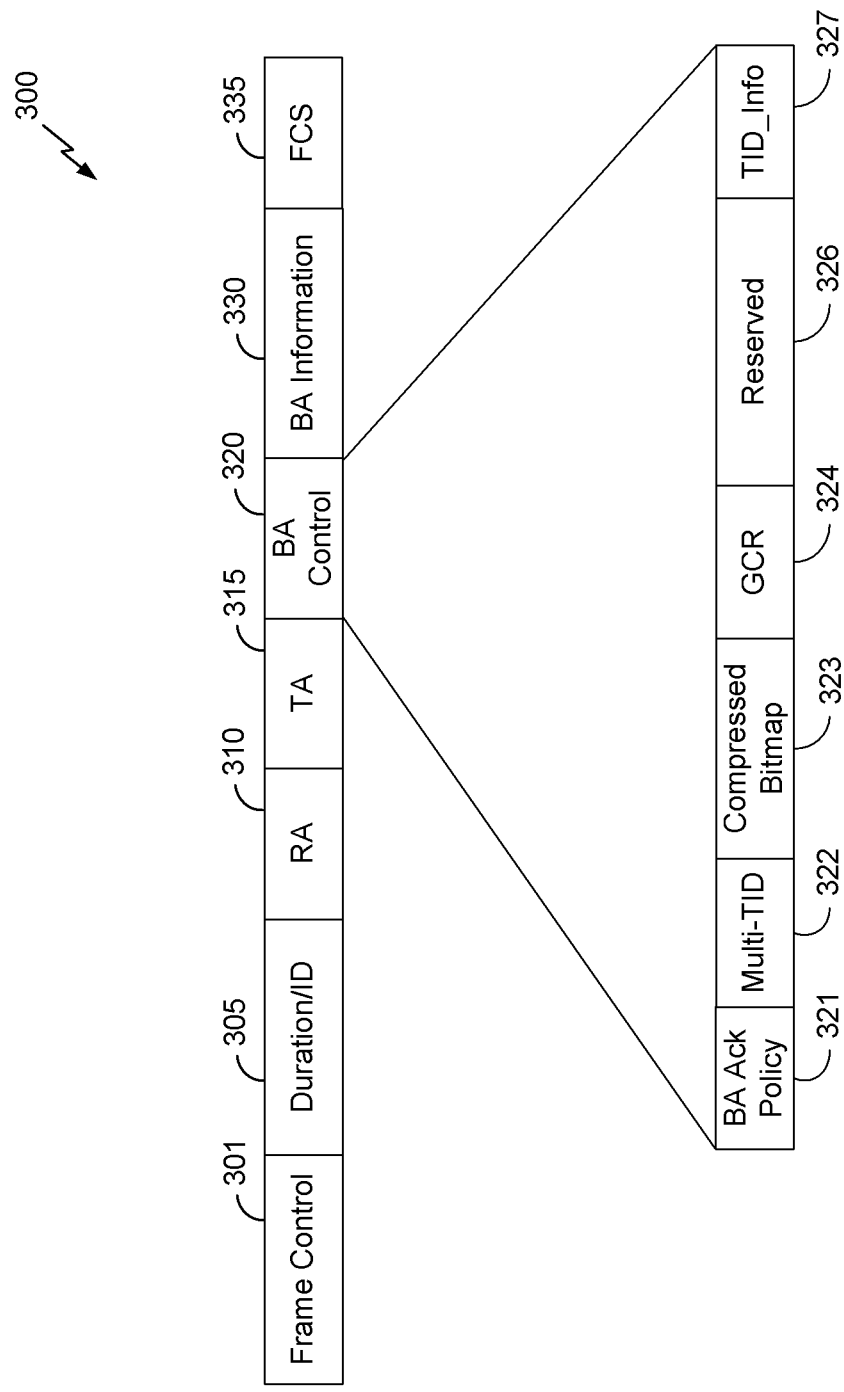
FIG. 3 illustrates an example of a block ACK frame.

FIG. 3 illustrates an example of a BA frame 300 according to the teachings herein. As shown, the BA frame 300 includes a frame control field 301, a duration/identifier (ID) field 305, a receiver address (RA) field 310, a transmitter address (TA) field 315, a BA control field 320, a BA information field 330, and a frame check sequence (FCS) field 335. In some aspects, the BA control field 320 may comprise a BA acknowledgment policy field 321, a multi-traffic identifier (TID) field 322, a compressed bitmap field 323, a group cast retries (GCR) field 324, a reserved field 326, and a TID information field 327. In some aspects, the BA acknowledgment policy field 321, the multi-traffic identifier (TID) field 322, the compressed bitmap field 323, and the GCR field 324 may each comprise one bit and the reserved field 326 may comprise 9 bits. In some aspects, the BA frame 300 may comprise a bitmap size of 64×16 bits.

Figures 4A, 4B:
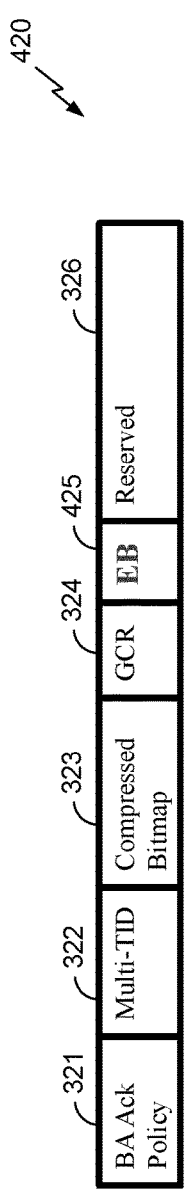
FIG. 4A shows another example of a block ACK frame.
FIG. 4B a chart showing exemplary block ACK frame variant encoding in accordance with the bock ACK frame format of FIG. 4A.

FIG. 4A shows an exemplary structure of a block acknowledgement (BA) control field 420. As shown, the BA control field 420 is similar to and adapted from the BA control fields 320 of FIG. 3. For the sake of brevity, only differences between the BA control fields 320 and 420 are discussed. In some aspects, one or more bits from the reserved field 326 may be re-configured to indicate the presence of a different bitmap size. For example, the one or more bits from the reserved field may be re-defined as an extended bitmap (EB) bit field 425. In some aspects the EB bit field 425 may be used in conjunction with the multi-traffic identifier (TID) field 322, the compressed bitmap field 323, and the GCR field 324 to define certain combinations that indicate the bitmap size which may be 64 bits or a different size.

For example, FIG. 4B illustrates a chart 450 depicting various exemplary combinations of bit values of the multi-traffic identifier (TID) field 322, the compressed bitmap field 323, and the GCR field 324 to indicate a BA variant. In some aspects, the one or more bits of the EB field 425 may be used to expand the possible BA variants depicted in the chart 450.

Figure 5:
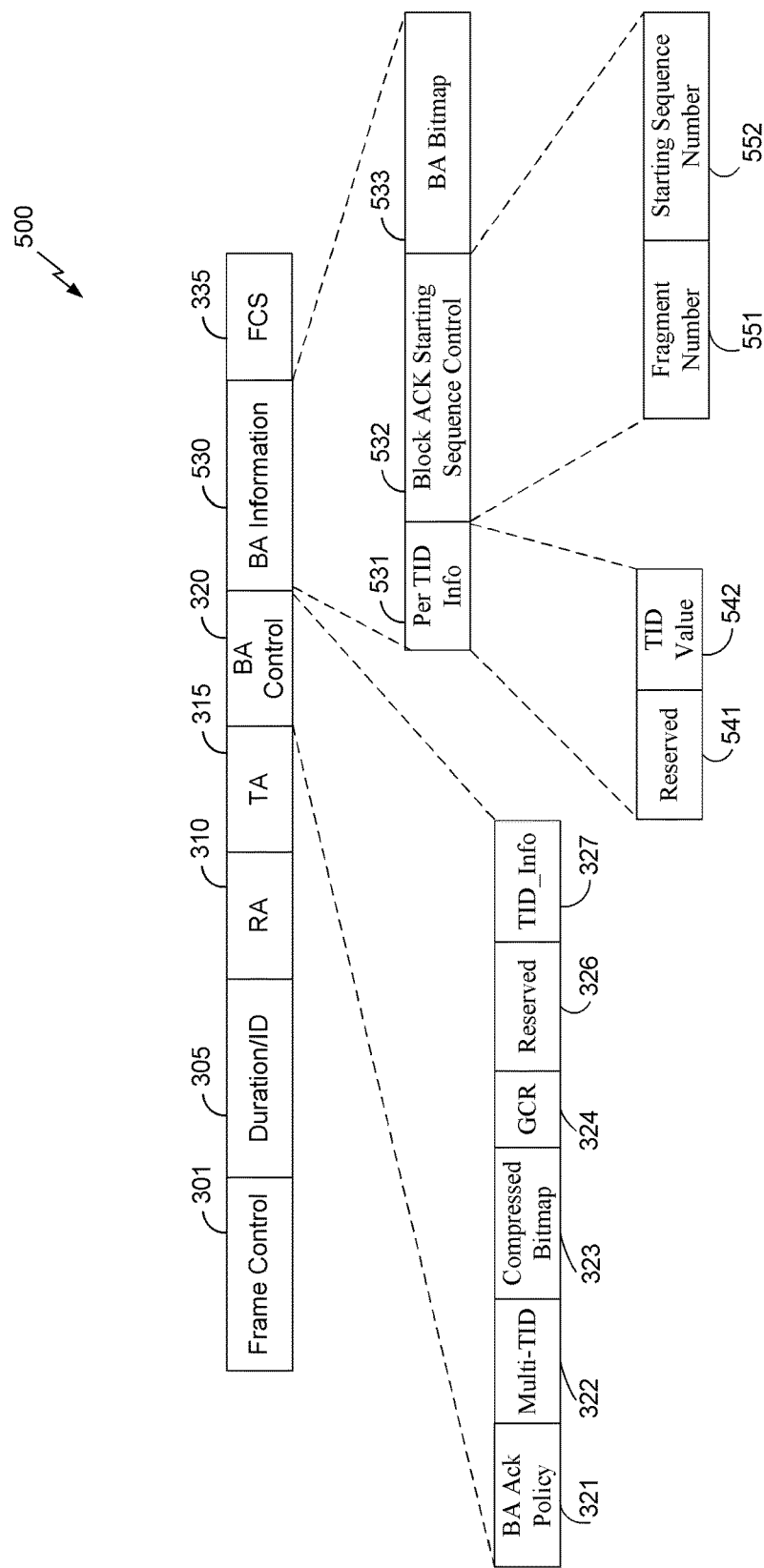
FIG. 5 shows another example of a block ACK frame.

FIG. 5 shows an exemplary structure of a BA frame 500. As shown, the BA frame 500 is similar to and adapted from the BA frame 300 of FIG. 3. For the sake of brevity, only differences between the BA frames 300 and 500 are discussed.

As shown in FIG. 5, the BA frame 500 comprises a BA information field 530. In some aspects, the BA information field 530 comprises a per TID information (Info) field 531, a block ACK starting sequence control 532, and a BA bitmap field 533. In some aspects, the per TID Info field 531 may comprise 2 bytes, the block ACK starting sequence control 532 may comprise 2 bytes, and the BA bitmap field 533 may comprise 8 bytes or may be a variable length. In some aspects, the BA bitmap field 533 may also be referred to as the BA bitmap size. In some embodiments, the BA information field 530 may be repeated for each TID. FIG. 5 also illustrates that the per TID Info field 531 may comprise a reserved field 541 and a traffic identifier (TID) value field 542. In some aspects, the reserved field 541 may comprise 12 bits and the traffic identifier (TID) value field 542 may comprise 4 bits. Additionally, the block ACK starting sequence control field 532 may comprise a fragment number field 551 and a starting sequence number field 552. In some aspects, the fragment number field 551 may comprise 4 bits and the starting sequence number field 552 may comprise 12 bits.

In some embodiments, an indication of the bitmap size (e.g., BA bitmap field 533 size) of the BA frame 500 may be located in different fields of the BA frame 500. For example, in some aspects, the BA bitmap size may be included in the reserved bits (e.g., reserved field 541) of the per-TID Info field 531 (valid for the including BA information field 530, e.g., may be different across BA information fields, if more than one are present). In other aspects, the indication may be included in the reserved bits (e.g., reserved field 326) of the BA control field 320 (may be same for all the BA Information fields 530). In some aspects, the indication may be included in a newly defined frame subtype of the BA frame 500. In some aspects, the indication may be included in the Duration/ID field 305, which can be overloaded if the BA frame 500 is sent in a multiple user (MU) PLCP protocol data unit (PPDU). The Duration/ID field 305 may be overloaded in a MU PPDU frame because only the intended receiver is going to receive the BA frame 500, and since the Duration/ID field 305 is usually intended for third party receivers (e.g., non-intended recipients) it may be possible to re-purpose some of the bits of Duration/ID field 305 in this context.

In other embodiments, a way to represent a longer bitmap (e.g., longer than 64 bits) may be to use a multi-TID BA format instead of extending the BA bitmap field 533. In some aspects, the multi-TID BA format may include multiple BA Information fields (e.g., BA information field 530) for the same TID, with different sequence numbers. In some aspects, each BA information field 530 may include the starting sequence number (SN) field 552 indicating the starting sequence for the bitmap. For example, referring to FIG. 5 a second BA information field 530 (not shown) may be located after the BA information field 530 shown and before the FCS field 335. Thus, the combined length of the BA bitmap field 533 may comprise the sum of the lengths of each of the BA bitmap fields 533 in each of the multiple BA Information fields (e.g., total size of the BA bitmap field comprises summing the BA bitmap fields in each of the BA information field 530 (shown in FIG. 5) and the second BA information field 530 (not shown)).

Additionally, new rules may be put in place for implicitly defining values of the bitmaps not explicitly communicated in the BA frame 500. For example, if a first BA Information field 530 includes a bitmap [1:64] and a second BA Information field 530 includes a bitmap for [80:144], then the missing bits (e.g., bits 65-79) may be assumed to be all set to a value of 1 to indicate a successful transmission or all set to a value of 0 to indicate a failed transmission.

In other embodiments, it may be desirable to acknowledge more than 64 messages (e.g., a media access control (MAC) protocol data unit (MPDU)) using 8 or fewer bytes of the BA bitmap field 533. In some aspects, each bit of the BA bitmap field 533 may be configured to acknowledge a group of messages (e.g., a group of N MPDUs). For example, each bit of the BA bitmap field 533 may be configured to acknowledge four (4) MPDUs. In this embodiment, a bit of the BA bitmap field 533 may be set to 1 to indicate a successful transmission, only if all 4 MPDUs are successfully transmitted. If one or more of the 4 MPDUs are not successful then the bit of the BA bitmap field 533 may be set to 0. In some embodiments, such a mapping may be desirable for high data rates where the high aggregation is used, and the errors in adjacent MPDUs are very likely correlated.

In some embodiments, the above group acknowledgement may be indicated in various locations of the BA frame 500. In some aspects, the same indications described above with respect to indicating the bitmap size may be applied to the group acknowledgment indication. In some aspects, the indication may be included in the reserved bits (e.g., reserved field 541) of the per-TID Info field 531 (valid for the including BA information field 530, e.g., may be different across BA information fields, if more than one are present). In other aspects, the indication may be included in the reserved bits (e.g., reserved field 326) of the BA control field 320 (may be same for all the BA Information fields 530). In some aspects, the indication may be included in a newly defined frame subtype of the BA frame 500. In some aspects, the indication may be included in the Duration/ID field 305, which can be overloaded if the BA frame 500 is sent in a MU PPDU.

In some embodiments, when using a variable length BA frame with a variable length BA bitmap size, it may be desirable to determine which BA bitmap size to send in the BA. In some embodiments, it may desirable to statically determine the length or size of the BA bitmap. In some aspects, the bitmap size may be determined during an initial session negotiation phase between an AP and STA or among a group of STAs. The BA bitmap size would then be based on the negotiated BA window. In some embodiments, the determined bitmap size may be based on an add block acknowledgement (ADDBA) negotiation. For example, if during negotiation, it is determined that the buffer size for the session is 256 bits, then the devices may set the BA bitmap size to 256. If the buffer size is smaller (e.g., 64 bits), then the devices may determine a buffer size of 64 bits is appropriate. While only two values are discussed for the buffer size and bitmap size other combinations for larger or smaller buffer and bitmap sizes are possible.

In some embodiments, it may be desirable to dynamically determine the BA bitmap size. In some aspects, a transmitter (e.g., AP) of a data frame may indicate a requested size of the BA bitmap size for a receiver device (e.g., STA) to include in the BA frame (e.g., BA frame 500) in response to the data frame. In some aspects, it may be beneficial for the transmitter to indicate the BA bitmap size because the transmitter may then know exactly how long the response (e.g., BA) will be from the receiver (e.g., STA) and may able to properly coordinate network traffic. In some aspects, the indication may be included in an aggregated media access control protocol data unit (A-MPDU) delimiter to indicate a request for 256 bit BA bitmap size (or other size). In some embodiments, the A-MPDU delimiter may be configured such that a defined pattern of bits indicate that the BA bitmap has a size different than 64 bits. In other embodiments, the indication may comprise an undefined A-MPDU delimiter value to indicate that the BA bitmap has a size different than 64 bits.

In some aspects, the indication may comprise a value in a media access control protocol data unit (MPDU) power save multipoll (PSMP) acknowledgment (ACK) policy field. For example, the PSMP ACK policy field may comprise a reserve bit that may be redefined to indicate one of two different sizes for the BA bitmap (e.g., 64 or 256). In other embodiments, the indication may be included in a field of a media access control (MAC) header. The MAC header may comprise one or more of a signal (SIG) field, a long training field (LTF), a short training field (STF). Each of the SIG, LTF, and STF fields may have different variants (e.g., high throughput (HT), very high throughput (VHT), high efficiency (HE), etc.). In some aspects, the indication of the bitmap size may be included in one or more of these MAC header fields and may be based on the physical (PHY) layer rate. For example, if the transmitter is transmitting data at a rate that satisfies a first threshold (e.g., higher than the first threshold), then the transmitter may set the BA bitmap size to a value larger than 64 bits (e.g., 128 or 256). If the transmitter is transmitting at a rate that does not satisfy the first threshold (e.g., at a rate lower than the first threshold), then the transmitter may set the BA bitmap size to a value smaller than 64 bits (e.g., 32 or 16). In some embodiments, the transmitter may use more or fewer thresholds and may set the bitmap size to different values.

In some aspects, a receiver (e.g., STA) of the data frame may indicate the BA bitmap size to include in the BA frame (e.g., BA frame 500) in response to the data frame. In some aspects, the receiver may determine the BA bitmap size based on the number of MPDUs it has received from the transmitter. In some aspects, the number of MPDUs it has received may be based on the span of received sequence numbers from the transmitter (e.g., AP). For example, if the receiver receives a large number of MPDUs it may set a larger BA bitmap size (e.g., 256 bits). If the receiver receives a small number of MPDUs it may set a smaller bitmap size (e.g., 32 bits).

Figure 6:
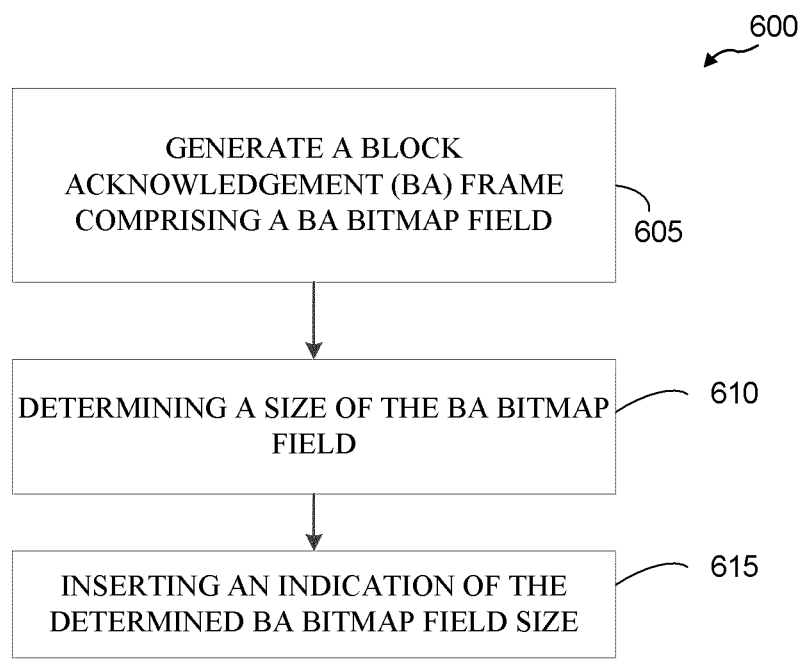
FIG. 6 is a flowchart of a method of wireless communication, in accordance with an implementation.

FIG. 6 is a flowchart of a method 600 for wireless communication, in accordance with an implementation. In some aspects, the method 600 may be performed by the wireless device 202, shown above with respect to FIG. 2. In some aspects, method 600 may be performed by the AP 104, the STA 106, or any suitable device.

At block 605, a device may generate a block acknowledgment (BA) frame comprising a BA bitmap field. For example, with reference to FIG. 5, the STA 106 may generate the BA frame 500 comprising the BA bitmap field 533. At block 610, the device may determine a size of the BA bitmap field. As discussed above with reference to FIG. 5, in some embodiments, the STA 106 may determine the size of the BA bitmap field based on a transmission received from a transmitter device (e.g., AP 104). At block 615, the device may then insert an indication of the determined size of the BA bitmap field. For example, the STA 106 may insert the indication in a field of the BA frame 500.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
generating, by an apparatus, a block acknowledgment (BA) frame comprising two or more BA information fields, wherein each of the two or more BA information fields included in the BA frame comprise a traffic identifier (TID) value field and a BA bitmap field;
determining a size of the BA bitmap field included in the BA frame based on a value of a field in a starting sequence control field;
inserting, into a field of each of the two or more BA information fields in the BA frame, an indication of the determined size of the BA bitmap field; and
transmitting the BA frame.

2. The method of claim 1, wherein the indication comprises a value.

3. The method of claim 1, wherein the BA frame comprises a BA acknowledgment (ACK) policy field, a multi-traffic identifier (TID) field, a compressed bitmap field, a group cast retries (GCR) field, and a bit of a BA control field, wherein the indication comprises a combination of values in the multi-traffic identifier (TID) field, the compressed bitmap field, the GCR field, and the bit of the BA control field.

4. The method of claim 1, wherein at least one of the two or more BA information fields includes a per traffic identifier (TID) field, and wherein the indication comprises a value in the per TID field.

5. The method of claim 1, wherein the BA frame comprises a BA control field, and wherein the indication is a value in the BA control field.

6. The method of claim 5, wherein the BA control field comprises a reserved field, and wherein the indication is a value in the reserved field.

7. The method of claim 1, wherein the BA frame comprises a duration/identifier (ID) field, and wherein the indication comprises a value in the duration/ID field.

8. The method of claim 1, wherein determining the size of the BA bitmap field comprises determining a size for each of the BA bitmap fields in each of the two or more BA information fields.

9. The method of claim 8, wherein each of the two or more BA information fields comprise the starting sequence control field.

10. The method of claim 9, wherein the two or more BA information fields comprise:
 a first BA information field with a first starting sequence number; and
 a second BA information field with a second starting sequence number, wherein determining the size of the BA bitmap field comprises defining values of bits between the first starting sequence number and the second starting sequence number.

11. The method of claim 1, wherein the traffic identifier (TID) value field indicates a same TID value for each of the two or more BA information fields.

12. The method of claim 1, wherein a bit of the BA bitmap field acknowledges a number of messages received.

13. The method of claim 12, wherein determining the size of the BA bitmap field is based on the number of messages received.

14. The method of claim 12, further comprising inserting an indication of the number of messages received in a field of the BA frame.

15. The method of claim 14, wherein the BA frame comprises a BA acknowledgment (ACK) policy field, a multi-traffic identifier (TID) field, a compressed bitmap field, a group cast retries (GCR) field, and a bit of a BA control field, wherein the indication of the number comprises a combination of values in the multi-traffic identifier (TID) field, the compressed bitmap field, the GCR field, and the bit of the BA control field.

16. The method of claim 1, wherein determining the size of the BA bitmap field is based on a negotiation between a transmitter of a data frame and a receiver of the data frame.

17. The method of claim 16, wherein the negotiation comprises an add block acknowledgement (ADDBA) negotiation between an access point and a station.

18. The method of claim 1, wherein determining the size of the BA bitmap field comprises:
 receiving a frame comprising an aggregated medium access control (MAC) data unit (A-MPDU) delimiter field, the A-MPDU delimiter field indicating a requested size of the BA bitmap field; and
 determining the size of the BA bitmap field based on the requested size.

19. The method of claim 1, wherein determining the size of the BA bitmap field comprises:
 receiving a frame comprising a media access control protocol data unit (MPDU) power save multipoll (PSMP) acknowledgment (ACK) policy field; and
 determining the size of the BA bitmap field based on a value of the PSMP ACK policy field.

20. The method of claim 1, wherein determining the size of the BA bitmap field comprises:
 receiving a frame comprising a medium access control (MAC) header portion, the MAC header portion comprising a field indicating a requested size of the BA bitmap field; and
 determining the size of the BA bitmap field based on the requested size.

21. The method of claim 20, wherein the requested size is based on a data rate of the frame received.

22. An apparatus for wireless communication, comprising:
 a processor configured to:
  generate a block acknowledgment (BA) frame comprising two or more BA information fields, wherein each of the two or more BA information fields included in the BA frame comprise a traffic identifier (TID) value field and a BA bitmap field;
  determine a size of the BA bitmap field included in the BA frame based on a value of a field in a starting sequence control field;
  insert, into a field of each of the two or more BA information fields in the BA frame, an indication of the determined size of the BA bitmap field; and
  transmit the BA frame.

23. The apparatus of claim 22, wherein the indication comprises a value.

24. The apparatus of claim 22, wherein the BA frame comprises a BA acknowledgment (ACK) policy field, a multi-traffic identifier (TID) field, a compressed bitmap field, a group cast retries (GCR) field, and a bit of a BA control field, wherein the indication comprises a combination of values in the multi-traffic identifier (TID) field, the compressed bitmap field, the GCR field, and the bit of the BA control field.

25. The apparatus of claim 22, wherein at least one of the two or more BA information fields includes a per traffic identifier (TID) field, and wherein the indication comprises a value in the per TID field.

26. The apparatus of claim 22, wherein the BA frame comprises a BA control field, and wherein the indication is a value in the BA control field.

27. The apparatus of claim 26, wherein the BA control field comprises a reserved field, and wherein the indication is a value in the reserved field.

28. The apparatus of claim 22, wherein the BA frame comprises a duration/identifier (ID) field, and wherein the indication comprises a value in the duration/ID field.

29. The apparatus of claim 22, wherein determining the size of the BA bitmap field comprises determining a size for each of the BA bitmap fields in each of the two or more BA information fields.

30. The apparatus of claim 29, wherein each of the two or more BA information fields comprise the starting sequence control field.

31. The apparatus of claim 30, wherein the two or more BA information fields comprise:
 a first BA information field with a first starting sequence number; and
 a second BA information field with a second starting sequence number, wherein determining the size of the BA bitmap field comprises defining values of bits between the first starting sequence number and the second starting sequence number.

32. The apparatus of claim 22, wherein the traffic identifier (TID) value field indicates a same TID value for each of the two or more BA information fields.

33. The apparatus of claim 22, wherein a bit of the BA bitmap field acknowledges a number of messages received.

34. The apparatus of claim 33, wherein the processor determines the size of the BA bitmap field based on the number of messages received.

35. The apparatus of claim 33, wherein the processor is further configured to insert an indication of the number of messages received in a field of the BA frame.

36. The apparatus of claim 35, wherein the BA frame comprises a BA acknowledgment (ACK) policy field, a multi-traffic identifier (TID) field, a compressed bitmap field, a group cast retries (GCR) field, and a bit of a BA control field, wherein the indication of the number comprises a combination of values in the multi-traffic identifier (TID) field, the compressed bitmap field, the GCR field, and the bit of the BA control field.

37. The apparatus of claim 22, wherein the processor determines the size of the BA bitmap field based on a negotiation between a transmitter of a data frame and a receiver of the data frame.

38. The apparatus of claim 37, wherein the negotiation comprises an add block acknowledgement (ADDBA) negotiation between an access point and a station.

39. The apparatus of claim 22, wherein the processor determines the size of the BA bitmap field based on a received frame comprising an aggregated medium access control (MAC) data unit (A-MPDU) delimiter field, and wherein the A-MPDU delimiter field indicates a requested size of the BA bitmap field.

40. The apparatus of claim 22, wherein the processor determines the size of the BA bitmap field based on a received frame comprising a media access control protocol data unit (MPDU) power save multipoll (PSMP) acknowledgment (ACK) policy field.

41. The apparatus of claim 22, wherein the processor determines the size of the BA bitmap field based on a received frame comprising a medium access control (MAC) header portion, and wherein the MAC header portion comprising a field indicating a requested size of the BA bitmap field.

42. The apparatus of claim 41, wherein the requested size is based on a data rate of the received frame.

43. A non-transitory computer-readable medium comprising code that, when executed, causes an apparatus to perform a method, the method comprising:
  generating, by an apparatus, a block acknowledgment (BA) frame comprising two or more BA information fields, wherein each of the two or more BA information fields included in the BA frame comprise a traffic identifier (TID) value field and a BA bitmap field;
  determining a size of the BA bitmap field included in the BA frame based on a value of a field in a starting sequence control field;
  inserting, into a field of each of the two or more BA information fields in the BA frame, an indication of the determined size of the BA bitmap field; and
  transmitting the BA frame.

44. An apparatus for wireless communication, comprising:
  means for generating, by an apparatus, a block acknowledgment (BA) frame comprising two or more BA information fields, wherein each of the two or more BA information fields included in the BA frame comprise a traffic identifier (TID) value field and a BA bitmap field;
  means for determining a size of the BA bitmap field included in the BA frame based on a value of a field in a starting sequence control field;
  means for inserting, into a field of each of the two or more BA information fields in the BA frame, an indication of the determined size of the BA bitmap field; and
  means for transmitting the BA frame.

* * * * *